Patented May 19, 1936

2,040,943

UNITED STATES PATENT OFFICE 2,040,943

FOOD PRODUCT AND PROCESS

Young S. Kang, Chicago, Ill., assignor to Minerva L. Guthapfel, sole proprietor of Sugar-Less Candy Company, Evanston, Ill.

No Drawing. Application February 12, 1934, Serial No. 710,892

4 Claims. (Cl. 99—83)

This invention relates to food products and more particularly to an all cereal product which has the appearance, sweet taste and many of the characteristics of candy made from sugar. The product is nourishing, wholesome and pleasant to eat and is particularly desirable for those who desire to avoid cane sugar in their diet.

I preferably use Chinese and American rice in their natural whole condition, in about equal proportions, mixed together and ground into meal or flour. Four parts of mixed rice are mixed with one part of whole wheat and malted barley also ground into flour or meal. Obviously these grains may be separately ground and mixed together or first mixed and then ground together. If desired the rice may be entirely of one kind.

The mixture is covered with water, about one-half gallon being used for each pound of the ground material, and boiled in a copper container until the liquid rises to the top and the mash settles to the bottom of the kettle. This usually requires about two hours, but the length of boiling time varies according to the character of the grain and the conditions under which the cooking operation is carried on. After the liquid and mash have separated, the contents of the kettle are simmered on a low fire (approximately 140° F.) for approximately eight hours, that is, until the mash has become a compact mass and thoroughly settled out of the liquid. Then the mixture is strained, the compact mass of mash is pressed to extract all the usable matter therefrom and the mash is discarded. The mash will have been rendered practically tasteless by this treatment. The strained liquid is then boiled in an open container until it is sufficiently sweet to the taste and until it has thickened so that when tested by dropping a small portion in water it becomes instantly hardened. This final cooking of the strained liquid usually requires about three hours.

The thickened mass is then placed on a cooling table and when slightly cooled is subjected to pulling on a pulling machine and then cut into bars or other shapes. The finished product may be dipped in chocolate or other covering material but this is not essential.

The analysis of the finished product is as follows:

|  | Per cent |
|---|---|
| Protein (nitrogen X 6.25) | 1.74 |
| Ash | 0.50 |
| Fat | 0.05 |
| Crude fiber | Trace |
| Reducing sugars calculated as anhydrous maltose | 66.50 |
| Sucrose from reduction before and after inversion | 3.00 |
| Apparent dextrines by hydrolysis and reduction before and after fermentation | 25.70 |
| Moisture | 2.51 |
|  | 100.00 |

I claim:—

1. The process of preparing an all cereal food product having the appearance, sweet taste, stretchability, and many characteristics of candy made from sugar, which comprises mixing ground rice and malted barley together, boiling the same in water until the solids separate from the liquid by settling, simmering the mixture until the solids form a relatively compact mass, straining the mixture, pressing the mash, and cooking the strained liquid until sweet and thick, and subjecting the mass to pulling.

2. The process of preparing an all cereal food product having the appearance, sweet taste and many characteristics of candy made from sugar, which comprises mixing ground rice and malted barley together, boiling the same in water for approximately two hours until the solids separate from the liquid by settling, simmering the mixture over a low fire for approximately eight hours until the solids form a relatively compact mass, straining the mixture, pressing the mash, and cooking the strained liquid in an open container for about three hours until sweet and thick, cooling the mass and subjecting it to pulling.

3. The process of preparing an all cereal food product having the appearance, sweet taste, stretchability and many characteristics of candy made from sugar, which comprises mixing together rice, whole wheat and malted barley, grinding said grains to form meal, boiling the mixture in water in the proportion of one-half gallon of water for each pound of the ground material, said boiling being continued until the solids separate from the liquid by settling, simmering the mixture until the solids form a relatively compact mass, straining the mixture, pressing the mash, and cooking the strained liquid until sweet and thick, and subjecting the mass to pulling.

4. A cooked rice product free from added sugar and having the sweet taste and appearance of candy made from sugar, comprising a non-gelatinous, ductile and stretchable mass produced from the liquor of a boiled mixture of ground rice and barley malt, and capable of being pulled to form a stable product.

YOUNG S. KANG.